(12) United States Patent
Brun

(10) Patent No.: US 9,642,494 B1
(45) Date of Patent: May 9, 2017

(54) RADIAL IMMERSION BLENDER

(71) Applicant: Kevin Brun, Santa Barbara, CA (US)

(72) Inventor: Kevin Brun, Santa Barbara, CA (US)

(*) Notice: Subject to any disclaimer, the term of this patent is extended or adjusted under 35 U.S.C. 154(b) by 463 days.

(21) Appl. No.: 14/459,717

(22) Filed: Aug. 14, 2014

Related U.S. Application Data

(60) Provisional application No. 61/893,288, filed on Oct. 21, 2013, provisional application No. 61/903,966, filed on Nov. 14, 2013, provisional application No. 61/982,868, filed on Apr. 23, 2014.

(51) Int. Cl.
  *B02C 23/36* (2006.01)
  *A47J 43/044* (2006.01)
  *B01F 13/00* (2006.01)
  *B01F 15/00* (2006.01)

(52) U.S. Cl.
  CPC .......... *A47J 43/044* (2013.01); *B01F 13/002* (2013.01); *B01F 15/00538* (2013.01); *B02C 23/36* (2013.01); *A47J 2043/04427* (2013.01); *B01F 2215/0014* (2013.01)

(58) Field of Classification Search
  CPC .......... A47J 43/044; A47J 2043/04427; B01F 15/00538; B01F 13/002; B01F 2215/0014; B02C 23/36
  USPC .......... 241/169.1, 282.1, 282.2, 46.01–46.17
  See application file for complete search history.

(56) References Cited

U.S. PATENT DOCUMENTS

| | | | |
|---|---|---|---|
| 1,300,560 A | 4/1919 | Bricknell et al. | |
| 1,982,059 A | 11/1934 | Lawler | |
| 2,258,830 A | 10/1941 | Vollrath | |
| 2,805,050 A | 9/1957 | Choppinet | |
| 2,896,925 A | 7/1959 | Place | |
| 3,117,769 A | 1/1964 | Spingler | |
| 3,135,500 A | 6/1964 | Perrinjaquet | |
| 3,251,580 A | 5/1966 | Adams | |
| 3,297,309 A | 1/1967 | Adams | |
| 3,299,924 A | 1/1967 | Hanschitz | |
| 3,307,834 A | 3/1967 | Wilde | |
| 3,333,830 A | 8/1967 | Spingler et al. | |
| 3,486,741 A | 12/1969 | Midgette | |
| 3,606,260 A | 9/1971 | Rubin | |
| 3,724,765 A | 4/1973 | Rohrbaugh et al. | |

(Continued)

*Primary Examiner* — Mark Rosenbaum
(74) *Attorney, Agent, or Firm* — Sandy Lipkin

(57) ABSTRACT

An improved immersion blender generally consisting of a motor, an elongated motor shaft that extends from the motor through a removable tubular guard to a back-to-back radial-flow cutter blade. The cutter blade is securely attached to the distal end of motor shaft and is housed within the tubular guard assembly. The tubular guard has a manifold at its distal end that provides side inlet and outlet ports for the blade and a lower inlet aperture through the distal annular plate of the manifold. The lower blade of the back-to-back radial-flow cutter draws liquid from the bottom portion of the container, through the lower inlet side-ports in the manifold and the aperture through the distal end of the manifold, and discharges the liquid through the outlet ports in the manifold toward the sides of container in a radial direction. The upper blade draws the liquid from the top portion of the container, through the upper inlet side-ports in the manifold, and discharges the liquid through the outlet ports toward the sides of container in a radial direction. The flow of the liquid drawn into the blades is towards the center axis of the motor shaft, and the flow of the liquid discharged from the blades is away from the center axis of the motor shaft.

9 Claims, 10 Drawing Sheets

(56) References Cited

U.S. PATENT DOCUMENTS

| | | | |
|---|---|---|---|
| 3,856,272 | A | 12/1974 | Ravitts |
| 3,920,227 | A | 11/1975 | Davis, Jr. |
| 4,008,883 | A | 2/1977 | Zubieta |
| 4,054,272 | A | 10/1977 | Cooke |
| 4,405,998 | A | 9/1983 | Brison |
| 4,745,068 | A | 5/1988 | Godfrey et al. |
| 4,850,699 | A | 7/1989 | Rebordosa |
| 5,360,170 | A | 11/1994 | Cartellone |
| 5,366,286 | A | 11/1994 | Ruttimann |
| 5,368,384 | A | 11/1994 | Duncan et al. |
| 5,803,598 | A | 9/1998 | Harry et al. |
| 5,836,684 | A | 11/1998 | Safont et al. |
| 5,863,118 | A | 1/1999 | Ackels et al. |
| 5,904,420 | A | 5/1999 | Dedoes |
| 6,186,056 | B1 | 2/2001 | Bruno et al. |
| 6,186,656 | B1 | 2/2001 | Penaranda et al. |
| 6,193,404 | B1 | 2/2001 | Calange |
| 6,293,691 | B1 | 9/2001 | Rebordosa et al. |
| 6,523,990 | B1 | 2/2003 | Lee |
| 6,634,784 | B2 | 10/2003 | Blakley |
| 6,863,430 | B2 | 3/2005 | Berube |
| 6,974,244 | B1 | 12/2005 | Lin |
| 7,056,009 | B2 | 6/2006 | Jagle et al. |
| 8,337,072 | B2 | 12/2012 | Shimizu |
| 8,408,418 | B2 | 4/2013 | Kuzelka |

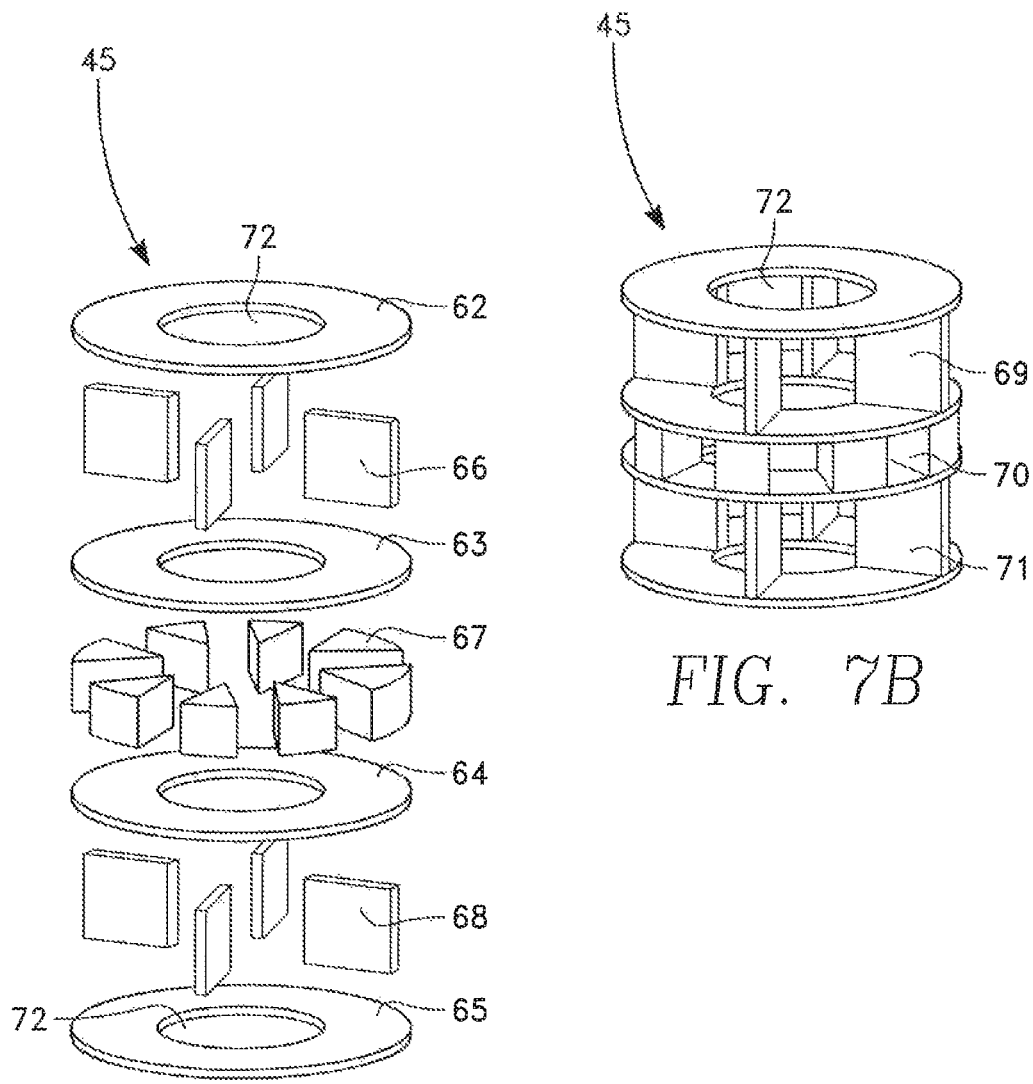

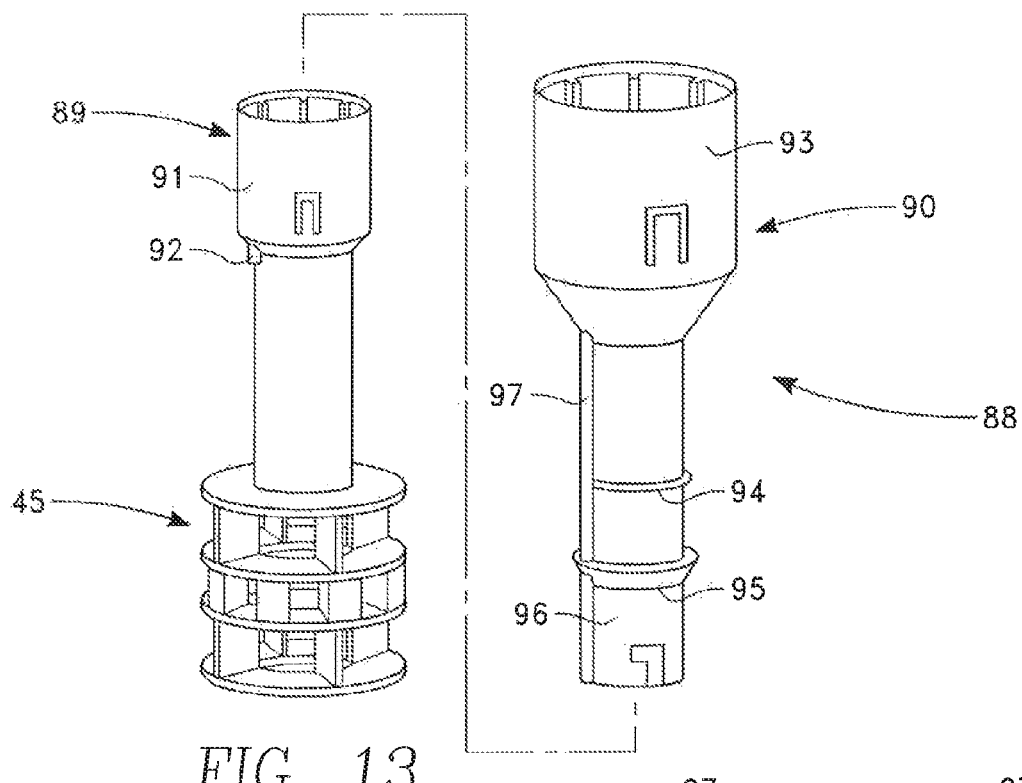
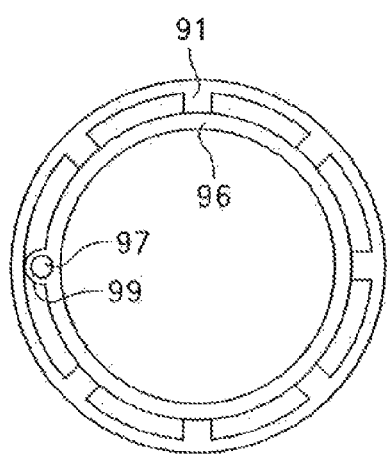
FIG. 13
FIG. 14
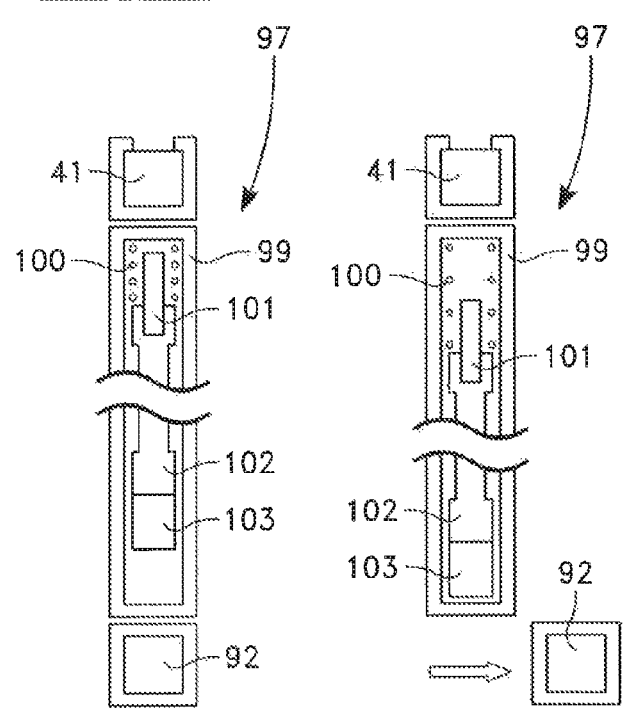
FIG. 15A    FIG. 15B

RADIAL IMMERSION BLENDER

REFERENCE TO PRIOR APPLICATION

This application claims priority of the provisional patent applications Nos. 61/893,288, filed Oct. 21, 2013, 61/903,966, filed Nov. 14, 2013, and 61/982,868, filed Apr. 23, 2014.

BACKGROUND OF THE INVENTION

Field of the Invention

The field of this invention relates generally to the field of hand-held power immersion blenders and more particularly toward those that are used to blend liquid food, such as sauces and soups. Immersion blenders are used in both commercial and home kitchens, and are suitable for blending other products in addition to food.

Description of the Prior Art

Prior art devices typically use an axial-flow cutter blade to blend the liquid. The leading edges of the blades are sharpened to cut the solid food mass that is suspended in the liquid. The blade is mounted to a shaft, and the shaft is rotatably mounted on bearings. The bearings are securely mounted inside a tubular support that extends to a motor housing. A shaft seal is placed on the shaft between the blade and lower bearing to protect the bearings from the liquid. A bell-shaped housing is attached to the blade end of the tubular support. The bell-shaped housing protects the blade and redirects the flow of liquid. The blade draws the liquid from the bottom of a liquid-holding container and discharges the liquid inside the bell-shaped housing that redirects the liquid towards the sides of the container.

The devices of the prior art have several drawbacks. One drawback relates to the shaft seal which is submerged in the liquid when the blender is being operated. During the operation of the blender, the liquid within the bell-shaped housing will be pressurized by the blade and the pressurized liquid is forced against the shaft seal. The dynamic action of the rotating shaft combined with the abrasive nature of the liquid food causes the seal to wear out. After the shaft seal fails, the liquid food by-passes the seal and ingress into the tubular support. The liquid food that remains inside the tubular support decomposes and results in bacterial growth. During the blending of subsequent batches of liquid food, the fresh batch of liquid food will then be forced inside the tubular support, which can become contaminated with the bacteria that previously formed inside the tubular support. When the blender is turned off, the liquid food that entered the tubular support will drain out of the tubular support into the fresh batch of liquid food thereby contaminating the fresh food with bacteria. This cross-contamination can cause offensive tastes and, more seriously, raise the potential for food poisoning. Further, the liquid ingression into the tubular support will cause the bearings to fail.

Another drawback with the prior art is with regard to operator fatigue that often occurs when using the larger commercial immersion blenders. Since blending within the body of liquid occurs mostly below the bell-shaped housing, the operator of the blender must move the blender around in the liquid to effectively blend the entire batch. If the blender is rested on the floor of the container, the liquid intake into the blade would become obstructed by the floor of the container and result in a reduction of blending efficiency. The spinning blade also creates a vortex in the liquid that bends upwards toward the surface of the liquid. The kinetic energy in the vortex will buffet the blender which can make the blender difficult to handle. Therefore, when using a larger commercial immersion blender the operator of the blender can become fatigued.

SUMMARY OF THE INVENTION

The basic embodiment of the present invention teaches a power driven immersion blender comprising: a motor; a housing for said motor; an elongated motor shaft extending from said motor said elongated motor shaft having a first end proximate said motor and a second end distal said motor; a rotary tool securely attached to said distal end of said elongated motor shaft; a removable tubular shaft guard attachable to said housing for said motor wherein said removable tubular shaft extends the length of said elongated shaft; and a manifold attached to said distal end of said tubular shaft guard.

The above embodiment can be further modified by defining that said rotary tool is stamped and formed of sheet metal.

The above embodiment can be further modified by defining that said rotary tool further comprises a plurality of upper blades and a plurality of lower blades that are formed to provide an axial flow element and a radial flow element, each of said pluralities of blades having a leading edge and a trailing edge wherein said leading edges are sharpened to cut solid mass that is suspended in liquid.

The above embodiment can be further modified by defining that said manifold further comprises a plurality of upper inlet ports and a plurality of lower inlet ports and a plurality of center discharge ports.

The above embodiment can be further modified by defining that said motor housing has a handle attached thereto.

The above embodiment can be further modified by defining that said motor housing further comprises a power control actuator.

The above embodiment can be further modified by defining that said removable tubular shaft is releasably secured to said motor housing.

The above embodiment can be further modified by defining that axial alignment is maintained between said motor shaft and said tubular shaft guard.

The above embodiment can be further modified by defining that power to said motor is disabled when said tubular shaft guard is not securely attached to said power drive immersion blender.

The above embodiment can be further modified by defining that an optional tubular shaft guard is broken down into two pieces and wherein said two piece tubular shaft guard further comprises: a removable upper tubular shaft guard, said removable upper tubular shaft guard being releasably securable to said motor housing wherein axial alignment is maintained between said motor shaft and said upper tubular shaft guard; and a lower tubular shaft guard attachable to said upper tubular shaft guard wherein axial alignment is maintained between said lower tubular shaft guard and said motor shaft; wherein power in said motor is disabled when either of said upper or lower tubular shaft guards are unlatched.

The above embodiment can be further modified by defining that there is a manifold with a plurality of upper inlet ports, a plurality of lower inlet ports and a plurality of center discharge ports.

The above embodiment can be further modified by defining that there is an optional manifold with a plurality of upper inlet ports and a plurality of lower discharge ports and an optional cutter blade with upper blades only.

The above embodiment can be further modified by defining that there is an optional manifold with a plurality of upper discharge ports and a plurality of lower inlet ports and an optional cutter blade with lower blades only.

The above embodiment can be further modified by defining that said manifold and said cutter blade replaces a prior art bell shaped housing and a prior art cutter blade.

The above embodiment can be further modified by defining that said manifold and said cutter blade replaces a prior art bell shaped housing and a prior art cutter blade.

The above embodiment can be further modified by defining that said manifold and said cutter blade replaces a prior art bell shaped housing and a prior art cutter blade.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 7A is an exploded view of the manifold.

FIG. 7B is a perspective view of the assembled manifold.

FIG. 13 is a perspective view of an optional two piece embodiment of the guard.

FIG. 14 is a top view detail of an optional two-piece guard.

FIG. 15A is a side cross-sectional view of the optional two piece guard safety switch device in the engaged position.

FIG. 15B is a side cross-sectional view of the optional two piece guard safety switch device in the disengaged position.

DETAILED DESCRIPTION OF A PREFERRED EMBODIMENT

Figure 1:
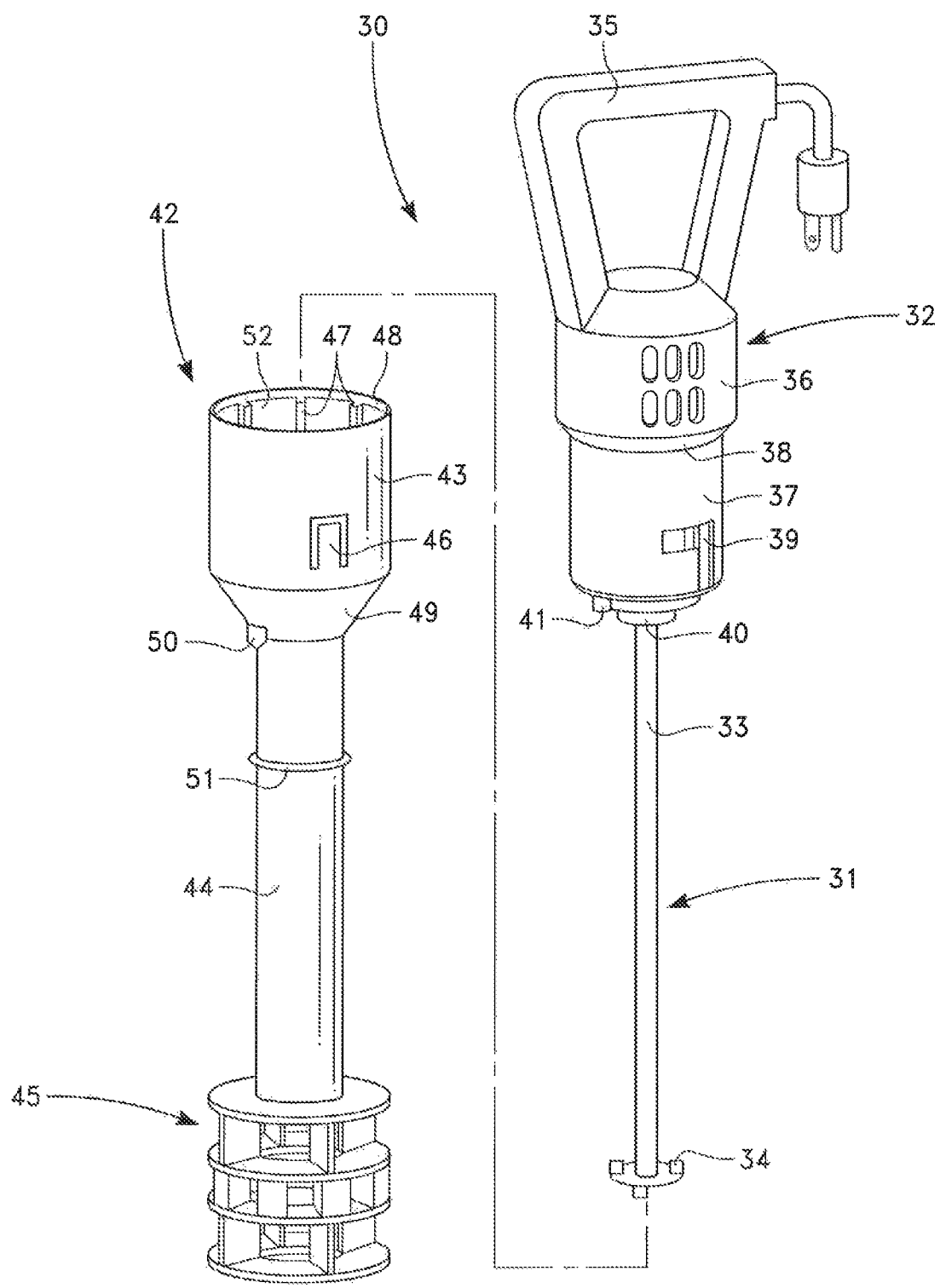
FIG. 1 is a perspective view of the blender of the instant invention with the guard removed.

Turning to the drawings, the preferred embodiment is illustrated and described by reference characters that denote similar elements throughout the several views of the instant invention.

The device of the instant invention provides a solution to the problems associated with prior art, namely the risk of contamination inherent in prior art devices and improved ease of use. It generally consists of a motor, an elongated motor shaft that extends from the motor through a removable tubular guard to a back-to-back radial-flow cutter blade. The cutter blade is securely attached to the distal end of motor shaft and is housed within the tubular guard assembly. The tubular guard has a manifold at its distal end that provides side inlet and outlet ports for the blade and a lower inlet aperture through the distal annular plate of the manifold. The lower blade of the back-to-back radial-flow cutter draws liquid from the bottom portion of the container, through the lower inlet side-ports in the manifold and the aperture through the distal end of the manifold, and discharges the liquid through the outlet ports in the manifold toward the sides of container in a radial direction. The upper blade draws the liquid from the top portion of the container, through the upper inlet side-ports in the manifold, and discharges the liquid through the outlet ports toward the sides of container in a radial direction. The flow of the liquid drawn into the blades is towards the center axis of the motor shaft, and the flow of the liquid discharged from the blades is away from the center axis of the motor shaft. This liquid flow prevents a vortex from forming, and prevents rotation in the body of liquid which results in a blender that is easier to handle. The radial-flow side-ports in the manifold allow the blender to be placed on the floor of the container without interrupting the liquid intake of the lower blade.

With the blender of the instant invention, the entire batch of liquid will be blended without the need to hold and stir the blender against the force created by the vortex as is the case with prior art. The motor shaft, the cutter blade, the blade fastener (not shown), the shaft guard, and the manifold are the only parts with surfaces that are immersed in the liquid. These surfaces can be readily accessed and cleaned by unlatching and removing the guard assembly from the drive assembly.

The preferred embodiment of the blender 30 is illustrated in FIGS. 1-8C. Referring to FIG. 1, the drive assembly 31 partly consists of a motor housing assembly 32, an elongated motor shaft 33, and a back-to-back radial-flow cutter blade 34. The motor housing assembly 32 can be made with an appropriate plastic, or any other suitable material, and consists of a handle 35, an upper motor housing 36, a cylindrical lower-motor housing 37, and an intermediate circular beveled housing 38 that is situated between the upper motor housing 36 and the lower motor housing 37. A latch keeper 39 is formed into the outer wall of the lower motor housing 37. A shaft seal 40 and a magnetically-actuated electrical safety switch 41 are mounted on the output end of the lower motor housing 37. The motor housing assembly 32 contains a motor (not shown) and a motor speed control (not shown). A means for controlling power to the motor (not shown) and a means to adjust the motor speed (not shown) are mounted in an appropriate location on the motor housing assembly 32. The motor shaft 33 can be solid or hollow, and should be constructed from a suitable material that will provide the necessary structural integrity to prevent flexing during operation.

A guard assembly 42 is shown in FIG. 1 as separated from a power drive assembly 31. The guard assembly 42 can be made with an appropriate plastic, or any other suitable material, and consists of a mounting socket 43, a shaft guard 44, and a manifold 45. A guard latch 46 is formed within the wall of the socket 43, and a plurality of ribbing 47 is formed on the inside wall 52 of socket 43. A chamfer 48 is formed on the inner perimeter of the proximal end of the socket 43 and on the ribbing 47. A tapered housing 49 connects the socket 43 to the shaft guard 44. A magnet 50 is mounted on the tapered housing 49. An annular band 51 is formed on the shaft guard 44 and serves as a visual depth gauge when the blender 30 is immersed into the liquid. The manifold 45 connects to the distal end of the shaft guard 44, and consists of side inlet and outlet ports to control the flow of liquid.

To install the guard assembly 42 onto the power drive assembly 31, the socket 43 end of the guard assembly 42 will be slid over the cutter blade 34 toward the lower motor housing 37 in the axial direction of the shaft 33. The socket 43 will slide over the lower motor housing 37, and the latch 46 will slide within a channel of the latch keeper 39. There should be at least two latches 46 and two latch keepers 39. The guard assembly 42 is rotated around the lower motor housing 37. The latch 46 will lock into position and the magnet 50 will align with the safety switch 41 thereby enabling the motor to be started. When the guard assembly 42 is unlatched, the safety switch 41 will interrupt power to the motor thereby preventing the motor from running when the guard assembly 42 is removed. The ribbing 47 in the socket 43 will freely constrain the socket 43 over the lower motor housing 37. The ribbing 47 reduces the friction when the socket 43 is slid over the lower motor housing 37, and provides strength and structural integrity to the socket 43. The chamfer 48 on the socket 43 and on the ribbing 47 will seat against the bevel in housing 38. The latch 46 will apply upward pressure on the socket 43 that will firmly hold the chamfer 48 against the bevel 38 thereby maintaining axial alignment between the shaft guard 44 and the motor shaft 33.

Figure 2:
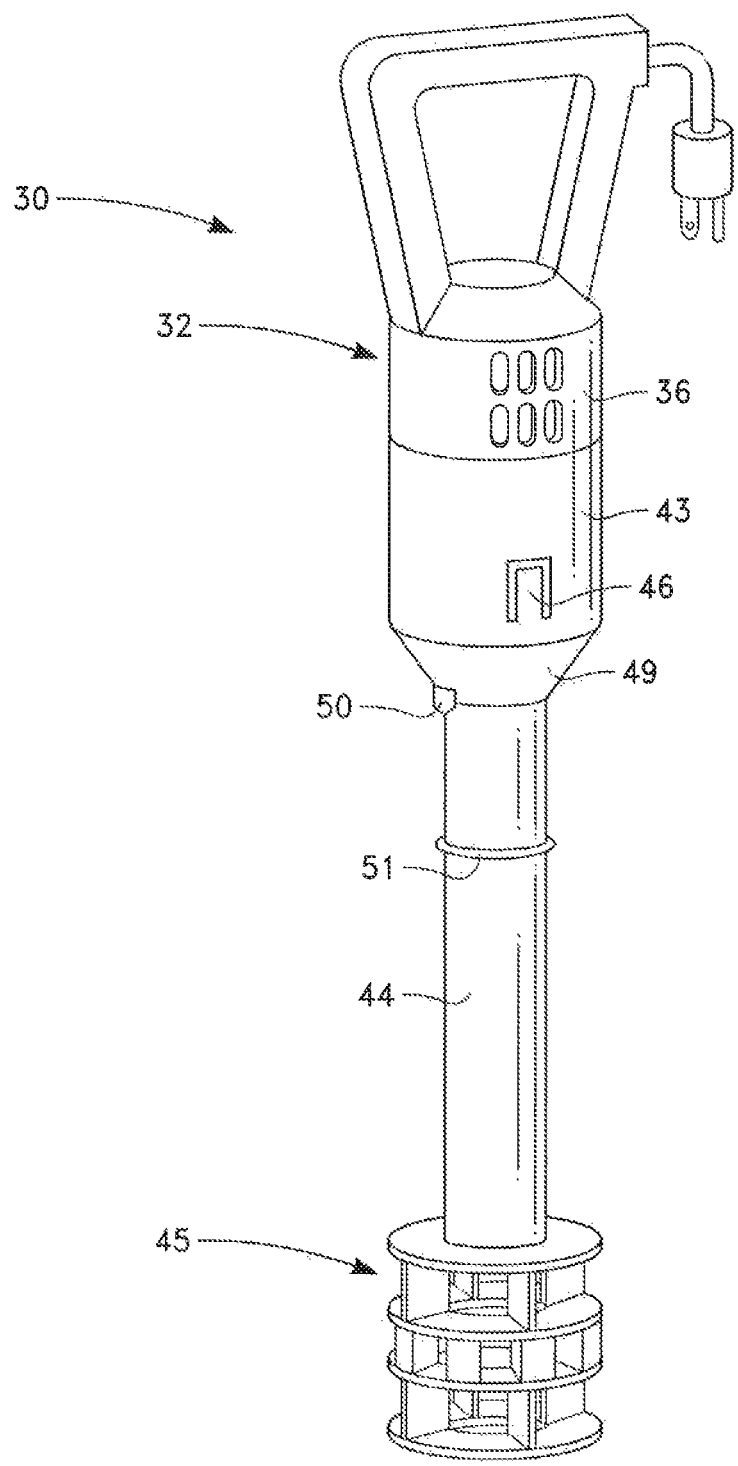
FIG. 2 is a perspective view of the blender of the instant invention with the assembly intact.

Turning to FIG. 2, the power drive assembly 31 is shown with the guard assembly 42 installed.

Figure 3:
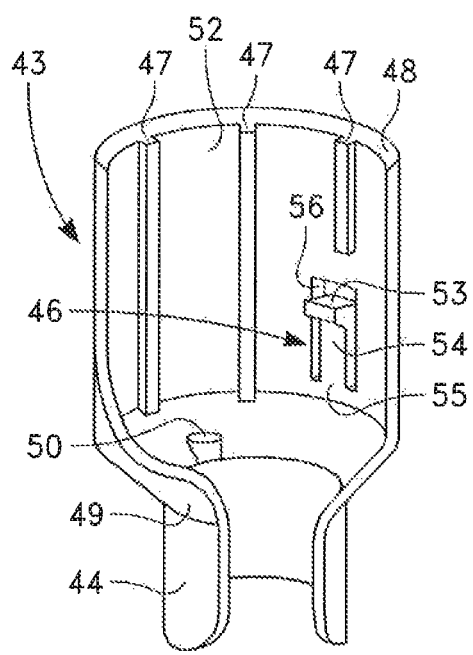
FIG. 3 is a cut-out view of the guard socket of the instant invention.

Turning to FIG. 3, a detailed view of the latch 46 on the socket 43 is shown. The latch 46 consists of a catch 53, a latch arm 54, and hinge 55, and a three sided opening 56 that surrounds the latch 46.

Figure 4:
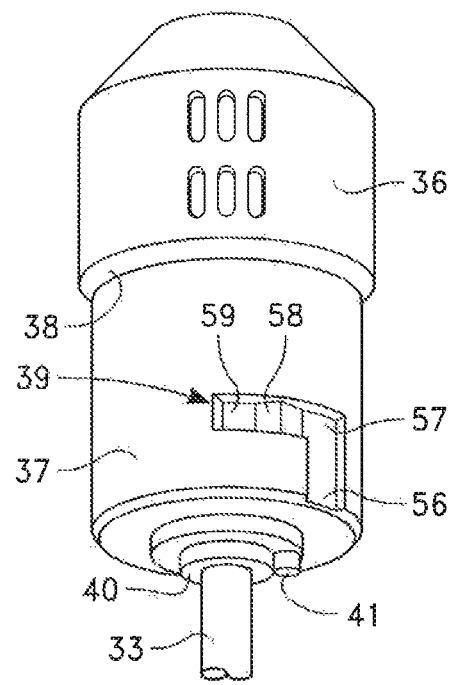
FIG. 4 is a partial-perspective view of the drive assembly of the instant invention.

Turning to FIG. 4, a detailed view of the latch keeper 39 on the lower motor housing 37 is shown. The latch keeper 39 consists of an axial channel 56, a radial channel 57, cam 58, and a seat 59.

The latching mechanism is further described in FIGS. 3-4. There should be at least two latches 46 and two latch keepers 39. One latch 46 and one latch keeper 39 can be keyed so the socket 43 can only be installed on the lower motor housing 37 in one way. This will insure that the magnet 50 will align with the safety switch 41 when installing and latching the guard assembly 42 onto the drive assembly 31. When sliding the socket 43 onto the lower motor housing 37, the catch 53 on the latch 46 will slide within the channel 56 on the lower housing 37. When the chamfer 48 seats against the bevel 38, the guard assembly 42 is rotated. The catch 53 slides within the channel 57, over the cam 58, and latches within the seat 59.

Figure 5:
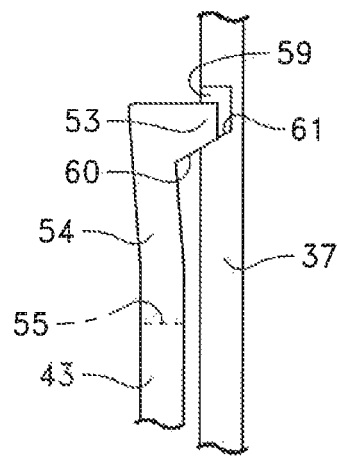
FIG. 5 is a partial cross-sectional view of the guard latch of the instant invention.

In FIG. 5, the latching mechanism is further detailed. When the guard assembly 42 is in the latched position on the lower motor housing 37, the catch 53 is retained within the latch keeper seat 59. The lower section 60 of the catch 53 impinges on the lower section 61 in the seat 59. When the chamfer 48 is seated against the bevel 38, the latch arm 54 is not allowed to return to its relaxed position. The spring force stored within the un-relaxed latch arm 54 applies an upward force on the socket 43 thereby holding the chamfer 48 firmly against the bevel 38. This will maintain the axial alignment between the shaft guard 44 and the motor shaft 33.

Figure 6:
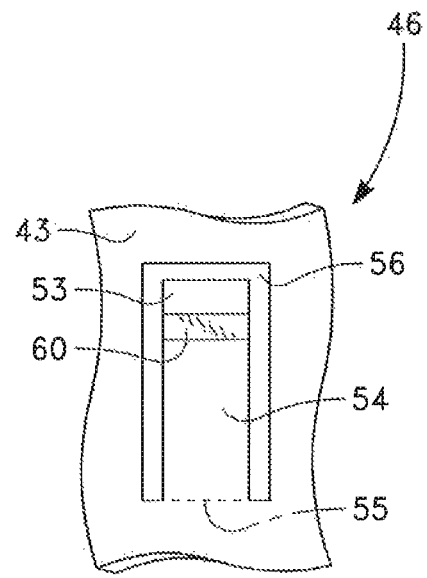
FIG. 6 is a partial front view of the guard latch of the instant invention.

In FIG. 6, a front detail view of the latch 46 is shown to illustrate the three-sided opening 56 around the latch 46.

The manifold 45 is illustrated in FIGS. 7A-7B. With regards to FIG. 7A, an exploded view of the manifold 45 is shown and consists of annular port plates 62, 63, 64, and 65, upper inlet port baffles 66, lower inlet port baffles 68, and center outlet port baffles 67. The upper inlet port baffles 66 are sandwiched between plates 62 and 63. The lower inlet port baffles 68 are sandwiched between plates 64 and 65, and the center outlet port baffles 67 are sandwiched between plates 63 and 64. In FIG. 7B, the assembled manifold 45 that forms an upper inlet port 69, a lower inlet port 71, and a center outlet port 70 is shown. A central aperture 72 extends through the center of the manifold 45 in an axial direction. The manifold 45 can be constructed with discrete components or molded from the appropriate material as one piece.

Figure 8A:
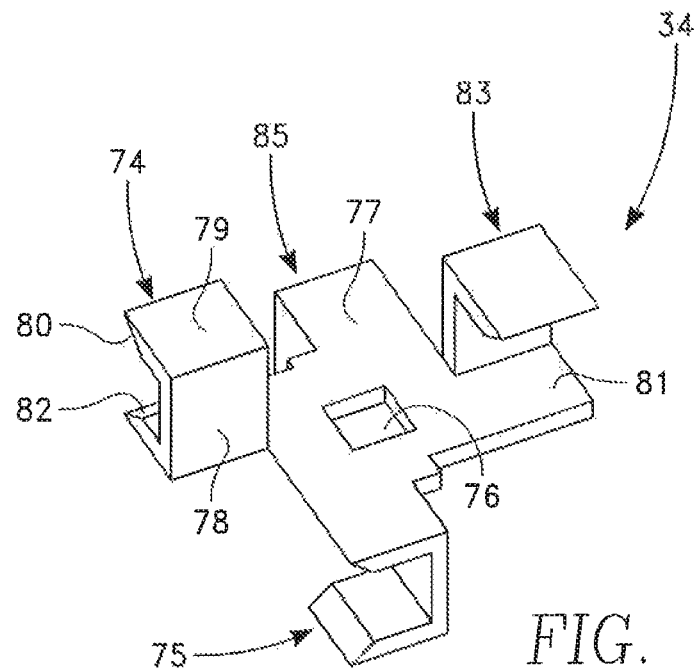
FIG. 8A is a perspective view of a back-to-back radial flow cutter blade formed from sheet metal.
Figure 8B:
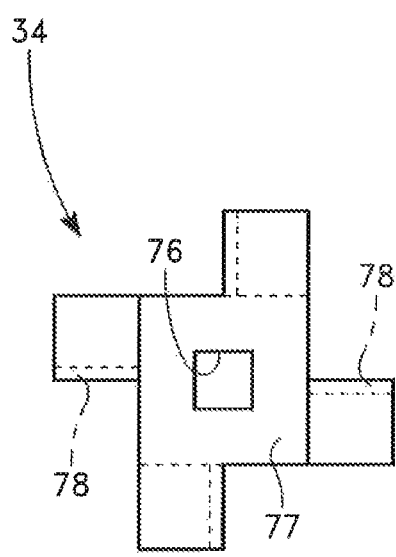
FIG. 8B is a top view of FIG. 8A.
Figure 8C:
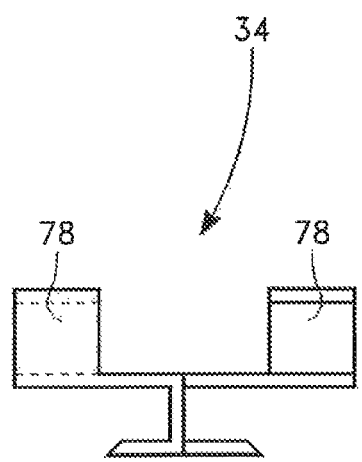
FIG. 8C is a side view of FIG. 8B.

With regards to FIGS. 8A-8C, the back-to-back radial-flow cutter blade 34 is illustrated. FIG. 8A shows a perspective view of the cutter blade 34. The cutter blade 34 is stamped and formed from sheet metal, and partly consists of two upper blades 74 and 83; and two lower blades 75 and 85.

Any number of blades can be used and should be geometrically situated to balance the cutter blade 34 to prevent vibration when the blender 30 is operated. The cutter blade 34 should be made from sheet metal suitable for the application.

A square hole 76 through the center axis of the main body 77 of the cutter blade 34 provides a means for mounting the cutter blade 34 to the motor shaft 33 with a threaded fastener (not shown). The threaded fastener will have a square shoulder that will pass through the square hole 76 in the cutter blade 34 thereby preventing the cutter blade 34 from rotating on the fastener when the blender 30 is operated. The force exerted on the cutter blade 34 during operation of the blender 30 should be in the direction that tightens the threaded fastener into the motor shaft 33. Any suitable means can be used to mount the cutter blade 34 to the motor shaft 33. With regards to the first upper blade 74, an upward vertical impeller blade 78 is formed from the main body 77, and a horizontal cutter blade 79 is formed from the upward vertical impeller blade 78. A leading edge 80 on the horizontal cutter blade 79 is sharpened, and a leading edge 82 on the upper blade support arm 81 is sharpened. Sharpening is optional, though efficiency would be reduced. The second upper blade 83 is positioned 180 degrees from the first upper blade, and is otherwise identical. The lower blades 75 and 85 are mirror images of the upper blades 74 and 83, and are positioned 90 degrees from the upper blades 74 and 83.

When the blender 30 is operated, the cutter blade 34 rotates around its center axis. Liquid is in drawn into the upper inlet ports 69, the lower inlet ports 71, and the aperture 72 that passes through the lower annular port plate 65. The lower annular port plate 65 can be formed without the aperture 72. The liquid flows into the upper blades, 74 and 83, and into the lower blades 75 and 85 on the cutter blade 34. The sharpened edges 80 and 82 will cut solid food that is suspended within the liquid food, and will direct the chopped food and the liquid toward the impeller blades 78. The impeller blades 78 will discharge the liquid and the chopped food in a radial direction through the center outlet ports 70.

FIG. 8B shows a top view of the cutter blade 34. FIG. 8C shows a side view of cutter blade 34. The vertical impeller blade 78 and the horizontal cutter blade 79 can be formed by curving the sheet metal, and all dimensions, angles, edges and surfaces can be adjusted to alter the flow characteristics of the radial-flow cutter blade 34.

Figure 9:
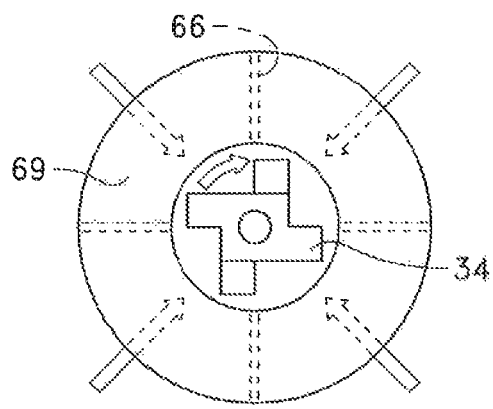
FIG. 9 is a top view of the upper inlet port assembly.

FIGS. 9-12B illustrate the flow of liquid into and out of the manifold 45. FIG. 9 shows a top view of the upper inlet ports 69. The liquid is drawn into the upper inlet ports 69 in a direction toward the center axis of the motor shaft 33 and becomes constrained between the horizontal parallel portplates 62, 63, and between the two adjacent vertical baffles 66 that are aligned at right angles to the axis of the motor shaft 33. As the liquid passes through the ports 69, in a direction toward the center axis of the motor shaft 33, the baffles 66 constrict the flow of the liquid, thereby increasing the velocity of the liquid into the upper blades 74, 83. Increasing the velocity of the liquid into the upper blades 74, 83 reduces cavitation in the upper blades 74, 83. The lower inlet ports 71 functions similarly to the upper inlet port 69, except the lower blades 75, 85 also draw liquid in through the aperture 72 that passes through the lower annular port plate 65. The lower annular port plate 65 can be formed without the aperture 72.

Figure 10:
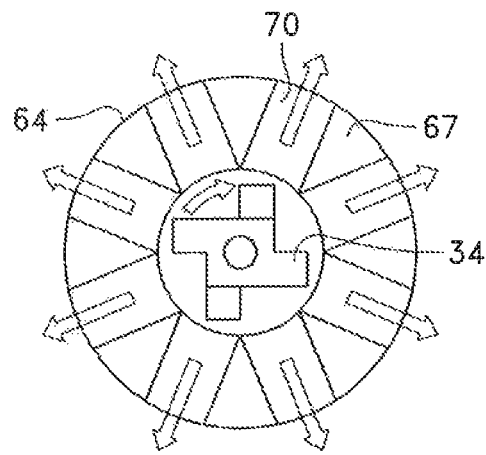
FIG. 10 is a top view of the outlet port assembly.

FIG. 10 shows a top view of the outlet ports 70. The impeller blades 78 discharge the liquid in a radial direction away from the center axis of the motor shaft 33. The liquid passes into the outlet ports 70 and becomes constrained between the parallel port plates 63, 64, and between the parallel port walls formed by two adjacent baffles 67. The liquid velocity into the outlet ports 70 is maintained throughout the ports 70 until the liquid is discharged from the ports 70 into the body of liquid. The stream of discharged liquid will flow through the body of liquid, diverging along the way, until it strikes the side walls of the container and is re-directed back towards upper inlet ports 69, the lower inlet ports 71, and the aperture 72 that passes through the lower annular port plate 65.

Figure 11:
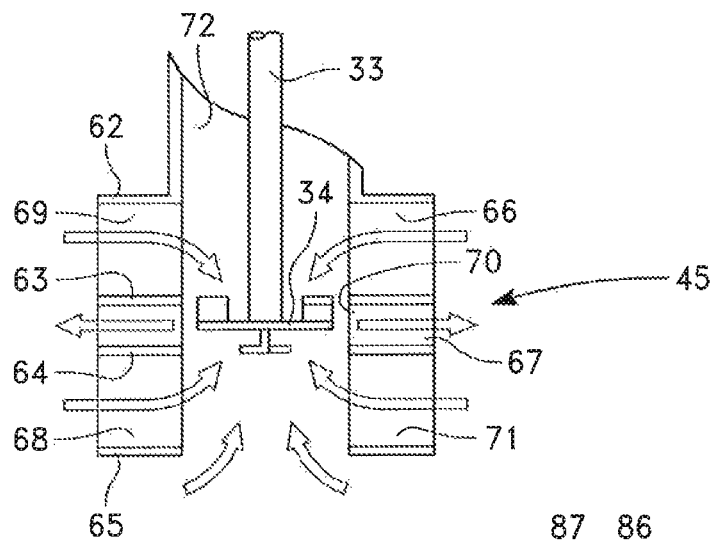
FIG. 11 is a side cross-section view of the manifold assembly, motor shaft and blade.

FIG. 11 shows a side cross-sectional view of the manifold 45, the motor shaft 33 and the cutter blade 34. The flow of liquid through the manifold 45 is illustrated.

Figure 12A:
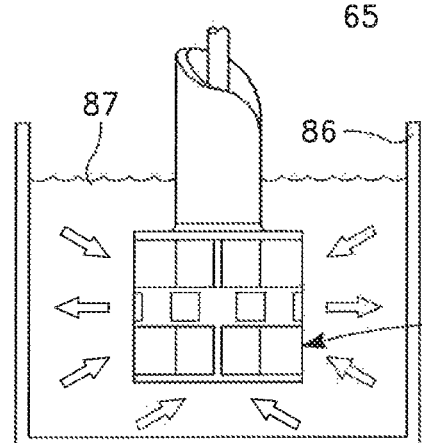
FIG. 12A is a side cross-section view of the blender of the instant invention immersed into a container of liquid.

FIG. 12A shows a side cutaway view of the container 86, the liquid 87, and the manifold 45 is shown. The direction of the flow in the body of the liquid 87 is illustrated.

Figure 12B:
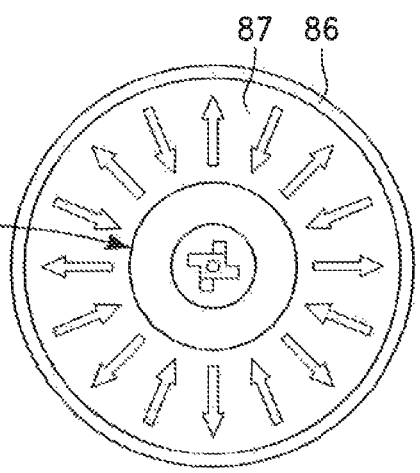
FIG. 12B is a top view of the blender immersed into a container of liquid.
Figure 16A:
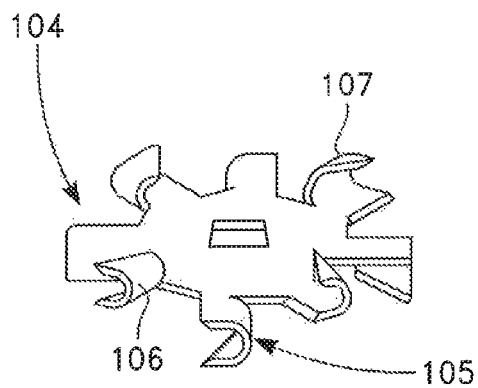
FIG. 16A is a perspective view of an optional eight blade cutter with curved blades that forms the horizontal impeller vane and the vertical cutter blade.
Figure 16B:
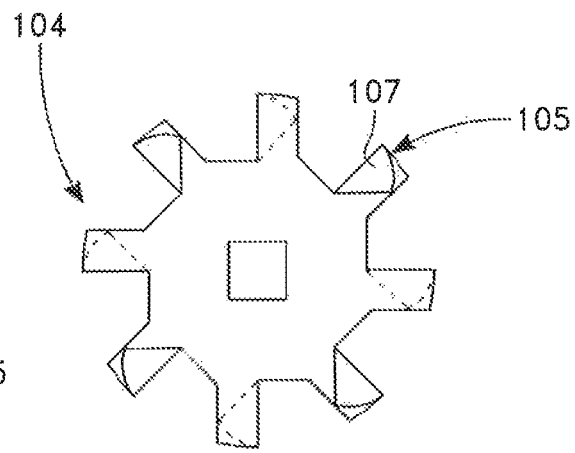
FIG. 16B is a top view of FIG. 16A.

FIG. 12B shows a top view of the container 86 and the manifold 45 is shown. The direction of the flow in the body of liquid 87 is illustrated. The direction of the inflow of liquid to the manifold 45 is towards the center axis of the motor shaft 33, and the direction of the outflow of liquid from the manifold 45 is away from the center axis of the motor shaft 33. The straight in and straight out laminar flow characteristics of the liquid through the ports prevents the body of liquid from rotating, and prevents the formation of a vortex thereby making the blender 30 is easier to handle.

The inlet ports 69, 71, and the outlet ports 70 that are formed from the port plates 62, 63, 64, 65, and the baffles 66, 67, 68, all combine to reduce cavitation in the cutter blade 34; prevent a liquid vortex in the body of liquid 87; and prevent rotation in the body of liquid 87. The centripetal force or center seeking force that is produced by the impeller blades 78 on the back-to-back radial-flow cutter blade 34 helps to stabilize the distal end of the motor shaft thereby reducing vibration from the motor shaft 33 during operation of the blender 30. The upward axial thrust on the motor shaft 33 caused by the upper blades 74, 83 is cancelled out by the downward axial thrust on the motor shaft 33 caused by the lower blades 75, 85. Therefore, the motor shaft 33 is held in axial balance which reduces excess thrust wear on the motor bearings.

The radial-flow cutter blade 34 that is used with the blender 30 typically operates at a much lower rotational speed than the axial flow blades that are used in the prior art. Vibrations that are caused by unbalanced conditions due to variations in mass within the rotating shaft and blade will be reduced at the lower speeds. One example of a motor that can be used with the blender 30 is a permanent magnet motor. Permanent magnet motors are quieter than a universal AC/DC motor that are commonly used in the prior art, and will therefore reduce noise pollution in the workplace. The motor shaft 33, the cutter blade 34, the blade fastener (not shown), the shaft guard 44, and the manifold 45 are the only parts with surfaces that are immersed in the liquid 87. These surfaces can be readily accessed and cleaned by unlatching and removing the guard assembly 42 from the drive assembly 31.

FIGS. 13-15B illustrates an optional embodiment of a two piece shaft guard. FIG. 13 illustrates a two piece guard 88, and consists of a lower guard housing 89 and an upper guard housing 90. The lower guard housing 89 consists of a socket 91 and a magnet 92 that are both similar in design and function as the socket 43 and magnet 50 previously described; and the lower guard housing 89 also consists of the manifold 45. The upper guard housing 90 consists of a socket 93, an annular band 94, an annular beveled band 95, a cylindrical housing 96, and an intermediate safety switch actuator 97. The socket 93 is similar to socket 43 previously described; the annular band 94 is similar to the annular band 51 previously described; the annular beveled band 95 is similar to the beveled housing 38 previously described; and the cylindrical housing 96 is similar to the lower housing 37 previously described.

The intermediate safety switch actuator 97 is detailed in FIGS. 14-15B. In FIG. 14, a cross-sectional top view of the socket 91 and the cylindrical housing 96 is shown for the purpose of illustrating the position of the intermediate safety switch actuator 97. In FIG. 15A, a cross-sectional side view of the intermediate safety switch actuator 97 is shown in the latched position. When the lower guard housing 89 is mounted and latched to the upper guard housing 90, the magnet 92 which is held securely on the lower guard 89 aligns with the magnet 103 that is freely held in the tubular housing 99 on the upper guard 90. The fields of magnets 92, 103 oppose each other, so the magnet 103 is forced upward thereby urging the pushrod 102 upward against a spring 100. This places the magnet 101 that is mounted on the pushrod 102 within the proximity of the safety switch 41 that is mounted on the lower motor housing 37 of the drive assembly 31 thereby enabling the motor to run.

In FIG. 15B, a cross-sectional side view of the intermediate safety switch actuator 97 is shown in the un-latched position. When the lower housing 89 is unlatched from the upper housing 90, the magnet 92 on the lower housing 89 becomes misaligned with the magnet 103, and the spring 100 urges the pushrod 102 and the magnet 101 downward thereby removing the magnet 101 away from the safety switch 41.

FIGS. 16A-20 illustrate optional embodiments of a cutter blade. With regards to FIG. 16A, an eight blade cutter 104 is shown with the sheet metal curved to form an upward vertical impeller 106 and a horizontal cutter 107 and a corresponding lower blade 105. FIG. 16B is a top view of FIG. 16A.

Figure 17:
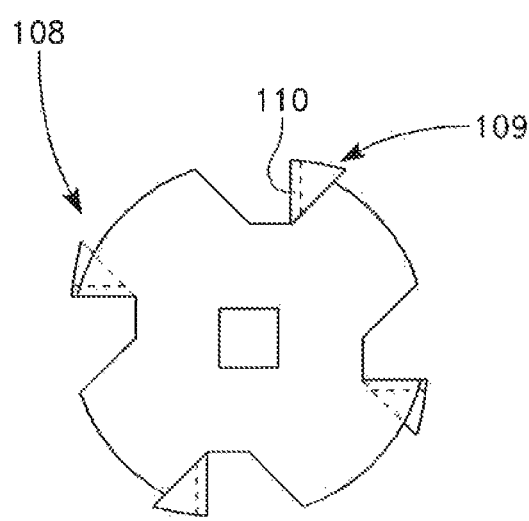
FIG. 17 is a top view of an optional blade with the impellers angled away from the radius line.

FIG. 17 is a four blade cutter 108 with the blades 109 rotated at an angle relative to the radius line of the cutter 108. A vertical impeller 110 will have a positive rake thereby aiding in the cutting of solid food that is suspended in the liquid.

Figure 18:
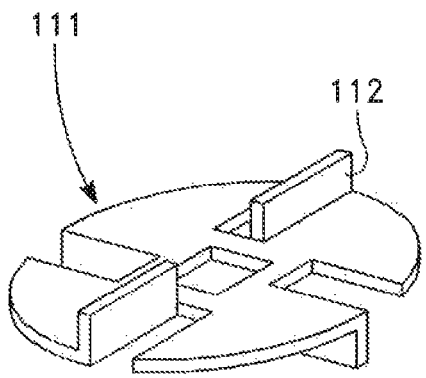
FIG. 18 is a perspective view of an optional blade without the horizontal cutter blades.

FIG. 18 is an alternate cutter blade 111 is shown. The impeller blade 112 has been formed without a horizontal cutter. The top edge of impeller blade 112 will shear the solid food, as opposed to chopping the food.

Figure 19:
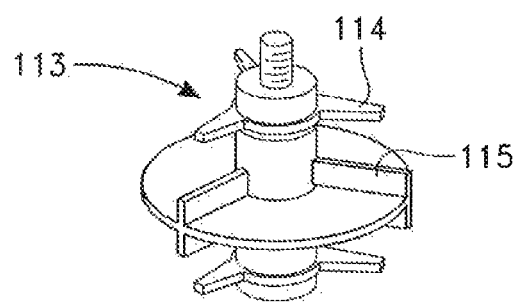
FIG. 19 is a perspective view of an optional blade assembly that features an axial cutter blade and radial impeller blades.

In FIG. 19, a cutter blade 113 is shown. It is assembled from several discrete components to form an axial flow cutter 114, and a radial flow impeller 115.

Figure 20:
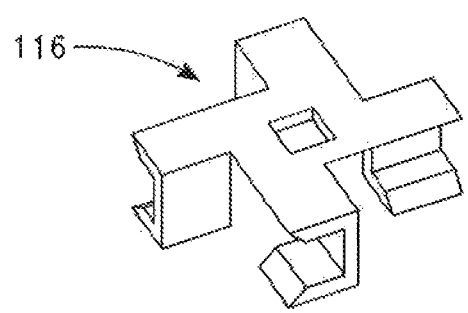
FIG. 20 is a perspective view of an optional single sided version of the blade in FIG. 8A.

In FIG. 20, a cutter 116 is shown that is a single sided version of the cutter shown in FIG. 8A.

Figure 21A:
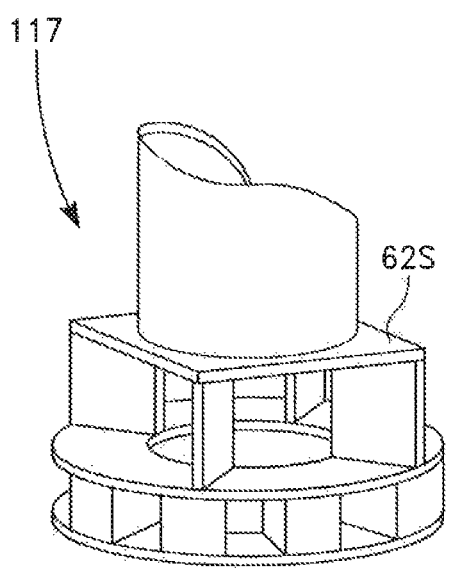
FIG. 21A is a perspective view of an optional upper inlet port manifold.
Figure 21B:
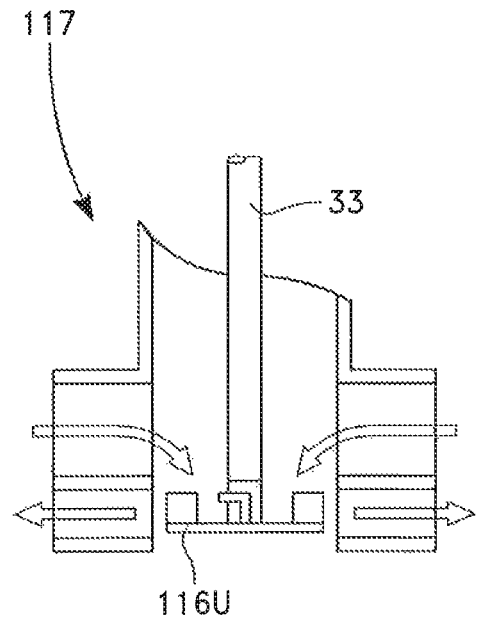
FIG. 21B is a cross-sectional view of the optional upper inlet port manifold in FIG. 21A with the motor shaft and a single sided blade.

FIGS. 21A-22B illustrate optional embodiments of manifolds used with the optional embodiments of the cutter 116, or with any single sided version of a suitable cutter, such as the various cutter embodiments described herein. With regards to FIG. 21A, a perspective view of a manifold 117 is shown that has upper inlet ports, and no lower inlet ports. A square upper plate 628 is shown that will allow greater access to the liquid above the manifold 117. In FIG. 21B, a side cross-sectional view of FIG. 21A is shown and illustrates the liquid flow through the manifold 117. The upper blade cutter 116U draws liquid from the top of the food container and discharges the liquid towards the sidewalls of the container.

Figure 22A:
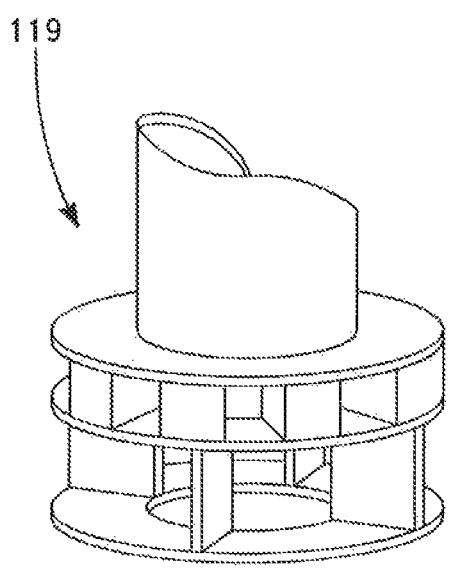
FIG. 22A is a perspective view of an optional lower inlet port manifold.
Figure 22B:
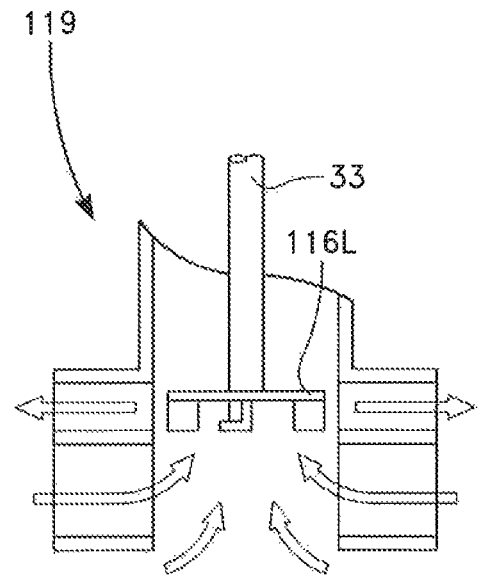
FIG. 22B is a cross-sectional view of the optional lower inlet port manifold in FIG. 22A with the motor shaft and a single sided blade.

With regards to FIG. 22A, a perspective view of a manifold 119 is shown that has the lower inlet ports, and no upper inlet ports. In FIG. 22B, a side cross-sectional view of FIG. 22A is shown and illustrates the liquid flow through the manifold 119. The lower blade cutter 116L draws liquid from the bottom of the food container and discharges the liquid towards the sidewalls of the container.

Figure 23A:
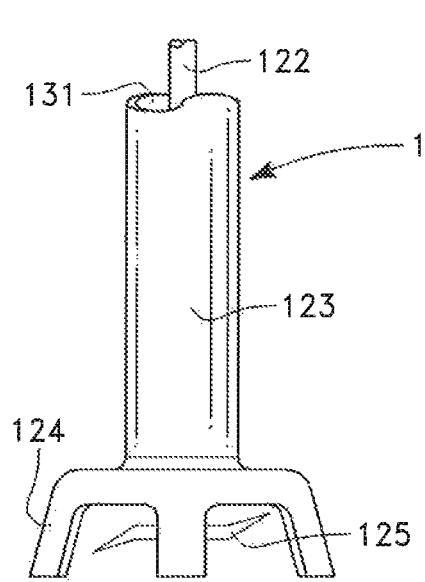
FIG. 23A is a partial side view of generic prior art.
Figure 23B:
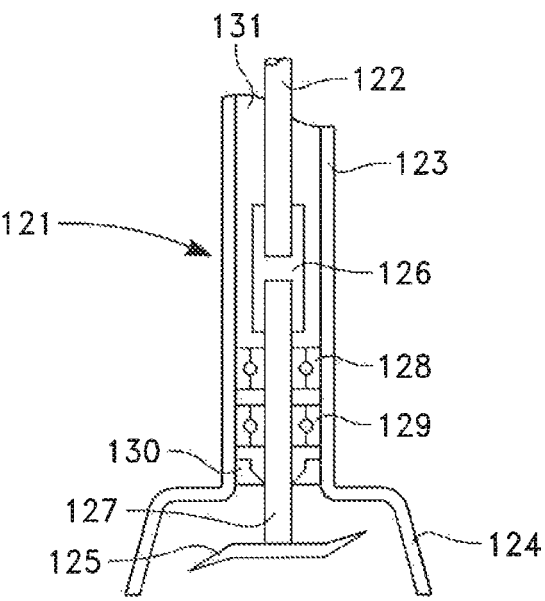
FIG. 23B is a cross-sectional view of FIG. 23A

FIGS. 23A-24B illustrate a method for adapting the manifold 45 and the cutter 34 to a prior art immersion blender. The generic prior art portrayed in FIGS. 23A-23B is intended for reference purpose only, and is not intended to depict any particular immersion blender known in the art. With regards to FIG. 23A, a partial side view of a generic prior art immersion blender 121 is shown. A drive shaft 122, a tubular support 123, a bell shaped housing 124, an axial flow cutter blade 125, and the inner void 131 of the tubular support 123 are illustrated. In FIG. 23B, a side cross-sectional view of FIG. 23A is shown, and illustrates a shaft coupler 126, an upper cutter shaft bearing 128, a lower cutter shaft bearing 129, and a shaft seal 130.

Figure 24A:
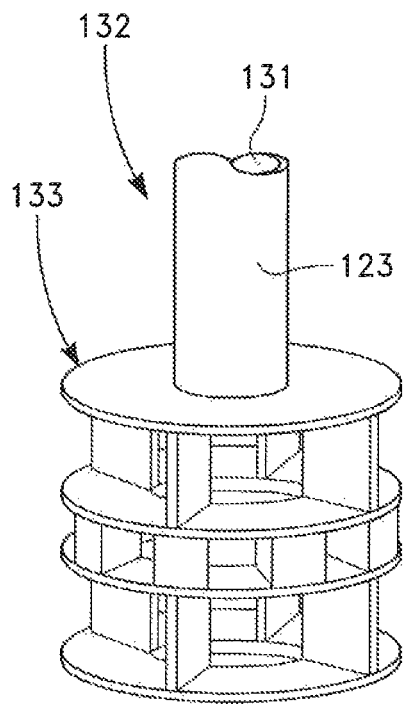
FIG. 24A is a perspective view showing the manifold of FIG. 7A attached to the prior art tubular support shown in FIG. 23A

FIG. 24A shows a partial perspective view of blender 132 includes a manifold 133 that is securely attached to the distal end of the tubular support 123. The bell shaped housing 124, the cutter shaft 127, and the cutter 125 of the prior art immersion blender 121 has been replaced with the manifold 133, the cutter shaft 134, and the cutter blade 135 of the instant invention.

Figure 24B:
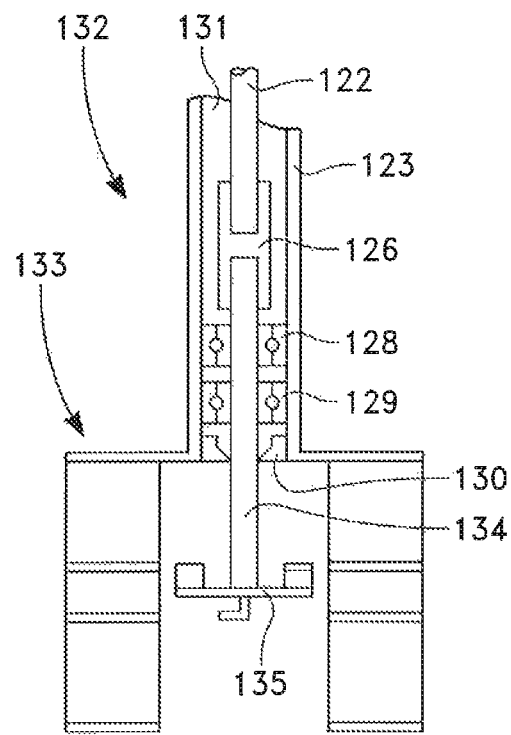
FIG. 24B is a cross-sectional view of FIG. 24A showing the manifold of FIG. 7A and the blade of FIG. 8A used with the prior art tubular support, shaft, bearings and seal shown in FIG. 23B.

In FIG. 24B, a side cross-sectional view of FIG. 24A is illustrated. In FIGS. 23A-24B, a method is shown for combining the manifold 45 and the cutter blade 34 from blender 30 with the tubular support 123, bearings 128 and 129, and the seal 130 of the generic prior art blender 121. This combining of elements from blender 30 with any prior art blender will improve the blending and handling of the blender 132; but it will also defeat the sanitary objective of blender 30, since the seal, bearings and tubular support of prior art will be subjected to the same drawbacks outline herein. Accordingly, this retrofit embodiment is not optimum.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A power driven immersion blender comprising;
    a motor;
    a housing for said motor;
    an elongated motor shaft extending from said motor said elongated motor shaft having a first end proximate said motor and a second end distal said motor;
    a rotary tool securely attached to said distal end of said elongated motor shaft;

a removable tubular shaft guard attachable to said housing for said motor wherein said removable tubular shaft extends the length of said elongated shaft; and a manifold attached to said distal end of said tubular shaft guard wherein said rotary tool further comprises a plurality of upper blades and a plurality of lower blades that are formed to provide an axial flow element and a radial flow element, each of said pluralities of blades having a leading edge and a trailing edge wherein said leading edges are sharpened to cut solid mass that is suspended in liquid.

2. The power driven immersion blender as defined in claim 1 wherein an optional manifold with a plurality of upper inlet ports and plurality of lower discharge ports and an optional rotary tool with upper blades with said manifold and said rotary tool disposed to control the direction of flow and the velocity of the fluids that pass therethrough.

3. The power driven immersion blender as defined in claim 1 wherein an optional manifold with plurality of upper discharge ports and a plurality of lower inlet ports and an optional rotary tool with lower blades with said manifold and said rotary tool disposed to control the direction of flow and the velocity of the fluids that pass therethrough.

4. A power driven immersion blender comprising;
a motor;
a housing for said motor;
an elongated motor shaft extending from said motor said elongated motor shaft having a first end proximate said motor and a second end distal said motor;
a rotary tool securely attached to said distal end of said elongated motor shaft;
a removable tubular shaft guard attachable to said housing for said motor wherein said removable tubular shaft extends the length of said elongated shaft; and
a manifold attached to said distal end of said tubular shaft guard wherein said manifold further comprises a plurality of upper inlet ports and a plurality of lower inlet ports and a plurality of center discharge ports.

5. The power driven immersion blender as defined in claim 4 wherein an optional manifold with a plurality of upper inlet ports and plurality of lower discharge ports and an optional rotary tool with upper blades with said manifold and said rotary tool disposed to control the direction of flow and the velocity of the fluids that pass therethrough.

6. The power driven immersion blender as defined in claim 4 wherein an optional manifold with plurality of upper discharge ports and a plurality of lower inlet ports and an optional rotary tool with lower blades with said manifold and said rotary tool disposed to control the direction of flow and the velocity of the fluids that pass therethrough.

7. A power driven immersion blender comprising;
a motor;
a housing for said motor;
an elongated motor shaft extending from said motor said elongated motor shaft having a first end proximate said motor and a second end distal said motor;
a rotary tool securely attached to said distal end of said elongated motor shaft;
a removable tubular shaft guard attachable to said housing for said motor wherein said removable tubular shaft extends the length of said elongated shaft; and
a manifold attached to said distal end of said tubular shaft guard wherein said removable tubular shaft guard is releasably secured to said motor housing with said tubular shaft guard devoid of bearings to rotatably support said elongated motor shaft.

8. A power driven immersion blender comprising;
a motor;
a housing for said motor;
an elongated motor shaft extending from said motor said elongated motor shaft having a first end proximate said motor and a second end distal said motor;
a rotary tool securely attached to said distal end of said elongated motor shaft;
a removable tubular shaft guard attachable to said housing for said motor wherein said removable tubular shaft extends the length of said elongated shaft; and
a manifold attached to said distal end of said tubular shaft guard wherein an optional tubular shaft guard is broken down into two pieces and wherein said two piece tubular shaft guard further comprises:
a removable upper tubular shaft guard, said removable upper tubular shaft guard being releasably securable to said motor housing wherein axial alignment is maintained between said motor shaft and said upper tubular shaft guard; and
a lower tubular shaft guard attachable to said upper tubular shaft guard wherein axial alignment is maintained between said lower tubular shaft guard and said motor shaft;
wherein power in said motor is disabled when either of said upper or lower tubular shaft guards are unlatched.

9. The power driven immersion blender as defined in claim 8 wherein there is a manifold with a plurality of upper inlet ports, a plurality of lower inlet ports and a plurality of center discharge ports with said manifold attached to the distal end of said lower tubular shaft guard.

* * * * *